April 18, 1933.  E. T. TURNER  1,904,337

FLOW REGULATOR

Filed July 5, 1927

INVENTOR.
E. T. TURNER.

ATTORNEY.

Patented Apr. 18, 1933

1,904,337

UNITED STATES PATENT OFFICE

EDWARD T. TURNER, OF DAYTON, OHIO

FLOW REGULATOR

Application filed July 5, 1927. Serial No. 203,375.

This invention relates to flow regulators and one object of the invention is to provide a device which will automatically maintain a substantially uniform flow of fluid through a conduit regardless of fluctuations of pressure in that conduit on either side of said device.

A further object of the invention is to provide such a device which will be simple in its construction and operation, compact in form and which can be produced and installed at a low cost.

Other objects of the invention will appear as the device is described in detail.

Figure 1:
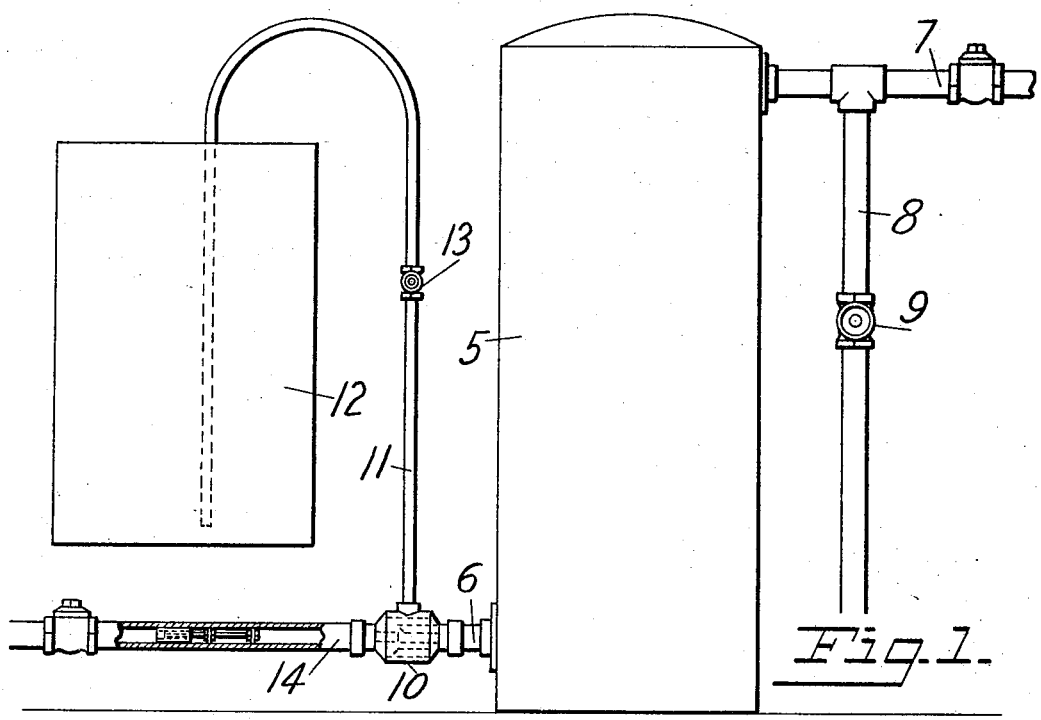
Figure 2:
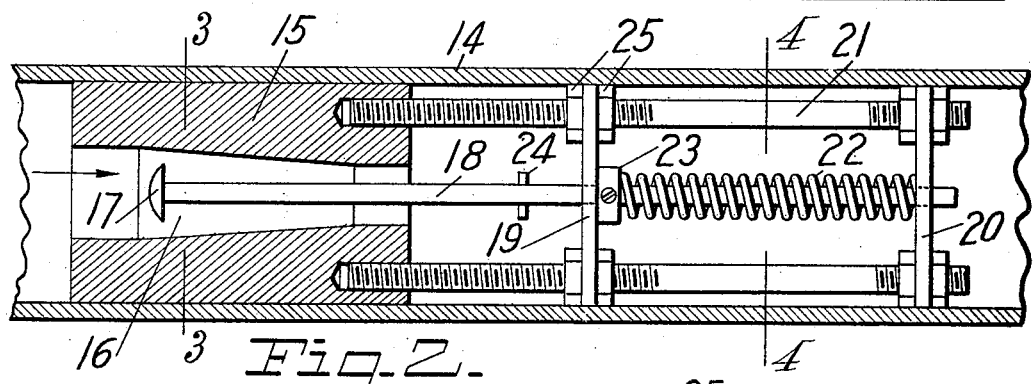
Figures 3, 4:
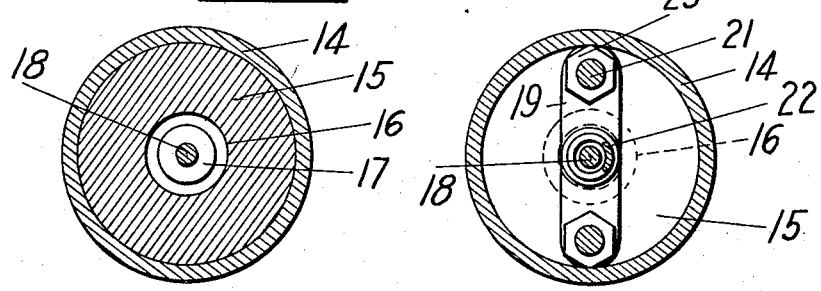

In the accompanying drawing Fig. 1 is a side elevation of a water softening apparatus showing the flow regulator applied thereto, partly in section; Fig. 2 is a longitudinal sectional view of the flow regulator; Fig. 3 is a transverse section taken on the line 3—3 of Fig. 2; and Fig. 4 is a transverse section taken on the line 4—4 of Fig. 2.

In this drawing I have illustrated one embodiment of my invention and have shown the same as designed for use in connection with a water softening apparatus but it will be understood that the device itself may take various forms and that it may be used for various devices.

In Fig. 1 of the drawing I have shown a simple water softening apparatus comprising a container 5 adapted to contain a bed of water softening material. Leading to the lower part of the container is a supply pipe 6 for the hard water and leading from the upper part of the container is a service pipe 7 and a drain pipe 8, the latter being controlled by the valve 9. Interposed in the supply pipe 6 is an injector 10 which is connected by means of a brine pipe 11 with a brine tank 12, the pipe 11 being controlled by a valve 13. When the valve 13 is opened the injector will draw the brine from the tank through the pipe 11 and deliver it to the container. With such an apparatus it is desirable to maintain a substantially uniform flow of water to the container. Excessive rate of flow due to high pressure will displace the water softening material, which is usually in the form of a granular material or sand, and cause the same to escape through the outlet pipes and when the injector 10 is used fluctuations in pressure cause a variation in the amount of brine delivered to the tank.

The regulating device which I have provided for the purpose of maintaining a uniform flow of fluid through the supply pipe 6, or through any other fluid conduit, comprises a housing 14 which is here shown as tubular in form and which, when installed, as shown in Fig. 1, constitutes a part of the supply pipe 6. If desired, this housing may consist of a section of pipe provided at its ends with the usual or any suitable means for connecting it into the conduit. The device as shown, has two parts, one of which has a passageway for the fluid and the other of which is arranged to partially obstruct the flow of fluid through the passageway. One of these parts is movable by fluid pressure to vary the relative position of the two parts and the two parts are of such relative shapes and sizes that any variation in their relative position will cause a variation in the capacity of the passageway. This movable part is subjected to water pressure on both the inlet side and the outlet side thereof and the pressure on the outlet side is supplemented by yieldable means which also resists the movement of the movable part by water pressure on the inlet side thereof, thus causing the movable part to be positioned in accordance with the difference in pressure on the two sides thereof, thereby restricting the passageway in proportion to the difference in pressure and maintaining a uniform rate of flow. These parts may take various forms and the operation of the movable part may be controlled in various ways. In that form of the device here shown, I have mounted within the housing 14 a partition or block 15 which is rigidly secured in position within the housing, preferably by inserting it therein with a driving fit. This partition is of considerable thickness and is provided with an elongated passageway 16, the walls of which converge in the direction of the flow of the fluid through the conduit, this direction being indicated by the arrow in Fig. 2. In the present instance, the end portions of the passageway are cylindrical in form and the intermediate portion is tapered, it being here shown as a frustum of a cone. Arranged within the passageway 16 is a movable member, here shown in the form of a head 17, the forward surface of which is opposed to the fluid entering the passageway and is preferably of a rounded or beveled contour. The rear surface of the head is shaped to oppose back pressure in the passageway and, in the present instance, is flat. It will be apparent that this head 17 partially obstructs the flow of the fluid through the passageway and that as it moves toward the smaller end of the passageway the obstruction offered thereby to the flow of the fluid will be increased, thus decreasing the capacity of the passageway. The movement of the head 17 is so controlled that its position will be determined by the pressures of the water in the conduit on the opposite sides of the device and as the pressure on the forward side of the device increases with relation to the pressure on the rear side thereof, the head will move toward the smaller end of the passageway, thereby reducing the cross sectional capacity of the passageway in proportion to the difference between said pressures. In the construction illustrated, the head is mounted on the forward end of a stem or rod 18 which extends through the smaller end of the passageway and is supported in suitable guides, such as cross bars 19 and 20, which cross bars are carried by rods 21 mounted in the block or partition 15 and, in the present instance, screw threaded into suitable openings in that partition. A spring 22 is coiled about the rod and is confined between the rearmost cross bar 20 and a collar 23 rigidly secured to the rod and this spring yieldably resists the movement of the head 17 by fluid pressure. The collar 23 acts as a stop which contacts with the forward cross bar 19 to limit the upstream movement of the head. If desired, the rod may be provided with a stop, such as a cross pin 24, to engage the cross bar 19 and limit the downstream movement of the head. The amount of movement which the head 17 may have and the resistance which is offered to that movement by the spring may be varied by adjusting one or both of the cross bars 19 and 20 along the rods 21, this being accomplished by means of the nuts 25.

It will be apparent that when there is low fluid pressure on the upstream side of the device, with relation to the pressure on the downstream side, the spring 22 will tend to hold the head 17 in its foremost position and as that pressure increases with relation to the pressure on the downstream side of the device, the head will be forced in a downstream direction against the action of the spring, thereby decreasing the effective cross sectional area of the passageway 16 and reducing the capacity of the passageway. The shape of the tapered passageway is such that the effective cross sectional area thereof will be such that there will always be a uniform flow of fluid through the conduit regardless of the relative positions of the head and passageways or of the difference in pressures on the two sides of the device. While theoretically, and disregarding friction, a passageway having a true taper will give the desired results, in practice it may be necessary to depart more or less from a true taper, and the term "taper" as herein used, is intended to include any passageway the cross sectional area of which decreases from one end to the other.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a flow regulating device, a tubular housing, a partition arranged within said housing and having a tapered passageway for fluid, a supporting structure carried by said partition and having a part forming a guideway, a rod slidably mounted in said guideway and extending into the passageway of said partition, a head carried by said rod and arranged to partially obstruct the flow of fluid through said passageway, and a spring acting on said rod to resist the movement of said head by fluid pressure.

2. In a flow regulating device, a tubular housing, a partition rigidly mounted within said housing and having a tapered passageway, rods supported by said partition and extending lengthwise of said housing, cross bars carried by said rods, another rod slidably mounted on said cross bars and extending into said passageway, a head carried by the last mentioned rod and arranged to partially obstruct the flow of fluid through said passageway, and a spring acting on said last mentioned rod to resist the movement of said head by said fluid pressure.

3. In a flow regulating device, a tubular housing, a partition rigidly mounted within said housing and having a tapered passageway, rods supported by said partition and extending lengthwise of said housing, cross bars carried by said rods, another rod slidably mounted on said cross bars and extending into said passageway, a head carried by the last mentioned rod and arranged to partially obstruct the flow of fluid through said passageway, a stop secured to the last mentioned rod between said cross bars, a spring confined between said stop and one of said cross bars to resist the movement of said head by fluid pressure, and means for adjusting one of said cross bars with relation to the first mentioned rods.

4. In a flow regulating device, a structure having a tapered passageway for fluid, a flow obstructing member arranged within said passageway and movable toward and from the smaller end of said passageway to vary the capacity of said passageway, said flow obstructing member being so arranged that one side thereof will be subjected to the pressure of fluid entering said passageway, said pressure tending to move said member toward the smaller end of said passageway, and the other side thereof will be subjected to back pressure in said passageway, means for supporting said member in said passageway, a spring to supplement said back pressure in resisting the movement of said flow obstructing member toward the smaller end of said passageway and to retain said member normally in a position near the larger end of said passageway, and means for adjusting said supporting means to vary the normal position of said flow obstructing member and for separately adjusting the tension of said spring.

5. Apparatus of claim 1 wherein the head carried by said rod serving to obstruct the flow of fluid is provided with a convex surface on its upstream side.

In testimony whereof, I affix my signature hereto.

EDWARD T. TURNER.